(12) United States Patent
Sumi (10) Patent No.: US 12,400,625 B2
(45) Date of Patent: Aug. 26, 2025

(54) MUSICAL ANALYSIS DEVICE, MUSICAL ANALYSIS METHOD, AND NON-TRANSITORY COMPUTER-READABLE MEDIUM

(71) Applicant: Yamaha Corporation, Shizuoka (JP)

(72) Inventor: Kouhei Sumi, Shizuoka (JP)

(73) Assignee: Yamaha Corporation, Shizuoka (JP)

( * ) Notice: Subject to any disclaimer, the term of this patent is extended or adjusted under 35 U.S.C. 154(b) by 781 days.

(21) Appl. No.: 17/705,117

(22) Filed: Mar. 25, 2022

(65) Prior Publication Data

US 2022/0215818 A1 Jul. 7, 2022

Related U.S. Application Data

(63) Continuation of application No. PCT/JP2020/028057, filed on Jul. 20, 2020.

(30) Foreign Application Priority Data

Sep. 27, 2019 (JP) ................. 2019-176923

(51) Int. Cl.
*G10H 1/00* (2006.01)
*G06N 3/045* (2023.01)
(52) U.S. Cl.
CPC ........... *G10H 1/0008* (2013.01); *G06N 3/045* (2023.01); *G10H 2210/076* (2013.01); *G10H 2210/375* (2013.01); *G10H 2250/311* (2013.01)
(58) Field of Classification Search
CPC ........... G10H 1/0008; G10H 2210/076; G10H 2210/375; G10H 2250/311; G06N 3/045

USPC ............................................ 84/609
See application file for complete search history.

(56) References Cited

U.S. PATENT DOCUMENTS

| 2008/0034948 A1* | 2/2008 | Sumita | G10H 1/40 84/636 |
| 2008/0115656 A1* | 5/2008 | Sumita | G10G 3/04 84/612 |
| 2008/0188967 A1* | 8/2008 | Taub | G10H 1/00 700/94 |

(Continued)

FOREIGN PATENT DOCUMENTS

| GB | 2573597 A | * 11/2019 | ............ A63B 69/00 |
| JP | 2007121563 A | * 5/2007 | |

(Continued)

OTHER PUBLICATIONS

Notice of Reasons for Refusal in the corresponding Japanese Patent Application No. 2019-176923, dated Aug. 1, 2023.

(Continued)

*Primary Examiner* — Christina M Schreiber
(74) *Attorney, Agent, or Firm* — Global IP Counselors LLP; David Tarnoff (57) ABSTRACT

A musical analysis device comprises an electronic controller including at least one processor. The electronic controller is configured to execute a plurality of modules including a detection module configured to detect, using a detection model through a model training process with machine learning, bar lines based on audio information indicating a musical piece, and a correction module configured to correct positions of the bar lines detected by the detection module based on a reference meter identified from the musical piece.

16 Claims, 4 Drawing Sheets

(56) References Cited

U.S. PATENT DOCUMENTS

| | | | | |
|---|---|---|---|---|
| 2010/0186576 A1* | 7/2010 | Kobayashi | ............... | G10H 1/40 |
| | | | | 84/612 |
| 2012/0227571 A1* | 9/2012 | Sasaki | .................. | G10H 1/0008 |
| | | | | 84/477 R |
| 2014/0033902 A1* | 2/2014 | Sasai | ....................... | G06F 16/00 |
| | | | | 84/611 |
| 2020/0152162 A1* | 5/2020 | Maezawa | ............. | G10H 1/0008 |
| 2021/0383781 A1* | 12/2021 | Moyer | ................. | G10H 1/0058 |
| 2022/0215818 A1* | 7/2022 | Sumi | ...................... | G06N 3/044 |

FOREIGN PATENT DOCUMENTS

| | | | | | |
|---|---|---|---|---|---|
| JP | 2010518428 A | * | 5/2010 | | |
| JP | 2010122629 A | * | 6/2010 | ............... | G10H 1/40 |
| WO | WO-2019017242 A1 | * | 1/2019 | ............... | G10G 3/04 |

OTHER PUBLICATIONS

International Search Report in PCT/JP2020/028057, dated Sep. 15, 2020.

\* cited by examiner

| | F VALUE |
|---|---|
| RESULT 1 (EXISTING TECHNOLOGY) | 0.739 |
| RESULT 2 (WITHOUT CORRECTION) | 0.812 |
| RESULT 3 (WITH CORRECTION) | 0.841 |
| RESULT 4 (WITH CORRECT BEAT) | 0.911 |

Figure 8

MUSICAL ANALYSIS DEVICE, MUSICAL ANALYSIS METHOD, AND NON-TRANSITORY COMPUTER-READABLE MEDIUM

CROSS-REFERENCE TO RELATED APPLICATIONS

This application is a continuation application of International Application No. PCT/JP2020/028057, filed on Jul. 20, 2020, which claims priority to Japanese Patent Application No. 2019-176923, filed on Sep. 27, 2019. The entire disclosures of International Application No. PCT/JP2020/028057 and Japanese Patent Application No. 2019-176923 are hereby incorporated herein by reference.

BACKGROUND

Field of the Invention

The present invention generally relates to a musical analysis device, a musical analysis method, and a musical analysis program for identifying bar lines from a musical piece.

Background Information

Techniques for analyzing a musical piece in order to detect various musical elements included in the musical piece have been proposed in the prior art. Examples of musical elements to be detected include bar lines, beat points, melodies, chords, tempos, and the like.

International Publication No. 2019/017242 (Patent Document 1) discloses a technology for estimating specific points, such as beat points, included in a musical piece, by means of a plurality of processes. Japanese Laid-Open Patent Application Publication No. 2010-122629 (Patent Document 2) discloses a technology for determining the progression of a bar line that represents the position of each beat of each meter of a series of beats, based on beat probability, similarity probability between beat sections, chord probability for each beat section, key progression, and key probability for each beat section.

SUMMARY

In the technology of Patent Document 1, which detects beat points in a musical piece, the correction of the length between beats (beat length) to be detected has not been specifically examined. The detection of bar lines has also not been specifically examined.

When bar lines within a musical piece are detected by means of machine learning, the detection may be quite sensitive to relatively minor changes in feature value. Accordingly, even if bar lines are simply detected by means of machine learning, the detection accuracy may not be sufficient. For example, since the length of a measure (number of beats included in the measure, etc.) in a musical piece, whose meter changes as the musical piece progresses (musical piece with a variable meter), is variable, there are many cases in which the detection accuracy of the bar line is inadequate.

One object of the present disclosure is to provide a musical analysis device, a musical analysis method, and a musical analysis program that can appropriately correct the positions of bar lines detected on the basis of machine learning.

In view of the state of the known technology, a musical analysis device according to one aspect of the present disclosure comprises an electronic controller including at least one processor. The electronic controller is configured to execute a plurality of modules including a detection module configured to detect, using a detection model through a model training process with machine learning, bar lines based on audio information indicating a musical piece, and a correction module configured to correct positions of the bar lines detected by the detection module based on a reference meter identified from the musical piece.

By means of the present disclosure, the positions of the bar lines detected based on machine learning are appropriately corrected.

DETAILED DESCRIPTION OF EMBODIMENTS

Selected embodiment of the present disclosure will be described in detail below with reference to the appended drawings. The embodiment described below can be appropriately revised or modified in accordance with various conditions and the configuration of the device to which the present disclosure is applied. In short, a musical analysis device 10 according to the present embodiment detects bar lines based on audio information indicating a musical piece, and corrects the positions of the detected bar lines in accordance with a prescribed rule.

Figure 1:
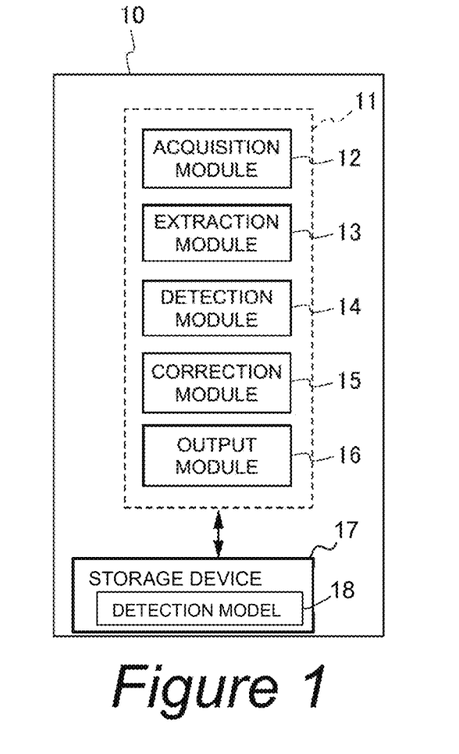
FIG. 1 is a block diagram showing the functional configuration of a musical analysis device according to one embodiment of the present disclosure.

FIG. 1 is a block diagram showing the functional configuration of the musical analysis device 10 according to one embodiment of the present disclosure. As shown in FIG. 1, the musical analysis device 10 has a control unit or device 11 and a storage unit or device 17.

The control device 11 is an electronic controller including one or more processors, and is illustrated as a functional block that integrally controls the operation of the musical analysis device 10. In addition, the control device 11 has, as functional blocks, an acquisition module 12, an extraction module 13, a detection module 14, a correction module 15, and an output module 16. Here, the term "electronic controller" as used herein refers to hardware, and does not include a human.

The acquisition module 12 acquires music data including audio information, which is the target in which bar lines are to be detected. The acquisition module 12 can acquire a musical piece already stored in the storage device 17, or acquire a musical piece from an external device such as a music providing server.

The extraction module 13 executes beat analysis (beat analysis) of audio information included in the musical piece acquired by the acquisition module 12 in order to extract a feature value (for example, a feature vector) for each beat.

The detection module 14 uses a detection model 18 through a model training process with machine learning in order to detect bar lines from a feature value corresponding to the audio information that indicates a musical piece. In the present embodiment, it is assumed that the meter of a musical piece changes in a time-sequential manner in accordance with the progression of the musical piece. For example, one musical piece of the present embodiment can include a performance portion that has 4/4 time and a performance portion that has 6/8 time. That is, a musical piece of the present embodiment can include a plurality of measures having different meters.

The correction module 15 corrects the positions of the bar lines detected by the detection module 14 based on a reference meter B. The reference meter B is a meter identified for the purpose of the correction process carried out by the correction module 15, and is, for example, a meter that forms the basis of the rhythm of the musical piece.

The output module 16 outputs bar lines detected by the detection module 14 and corrected by the correction module 15.

The storage device 17 includes one or more computer memories and stores various data (musical pieces, audio information, feature values, bar lines, etc.) used for the processing executed by the control device 11 described above. In addition, the storage device 17 stores the detection model 18 used for the detection process executed by the detection module 14. The detection model 18 is, for example, a trained neural network, and is defined by the network structure and various parameters. In the illustrated embodiment, the storage device 17 can be any computer storage device or any computer readable medium with the sole exception of a transitory, propagating signal. For example, the storage device 17 can be a computer memory which can be nonvolatile memory and volatile memory.

As described above, the musical analysis device 10 according to the present embodiment can correct the positions of the bar lines detected from the musical piece on the basis of machine learning based on the reference meter B. Thus, compared to a configuration in which bar lines are detected simply on the basis of machine learning (detection model), it is possible to determine the positions of the bar lines more accurately.

The control device 11 can only have some of the functional blocks described above. For example, the control device 11 can only include the detection module 14 that detects bar lines based on the feature value of the musical piece acquired by an arbitrary method, and the correction module 15 that corrects the positions of the detected bar lines based on the reference meter B.

Figure 2:
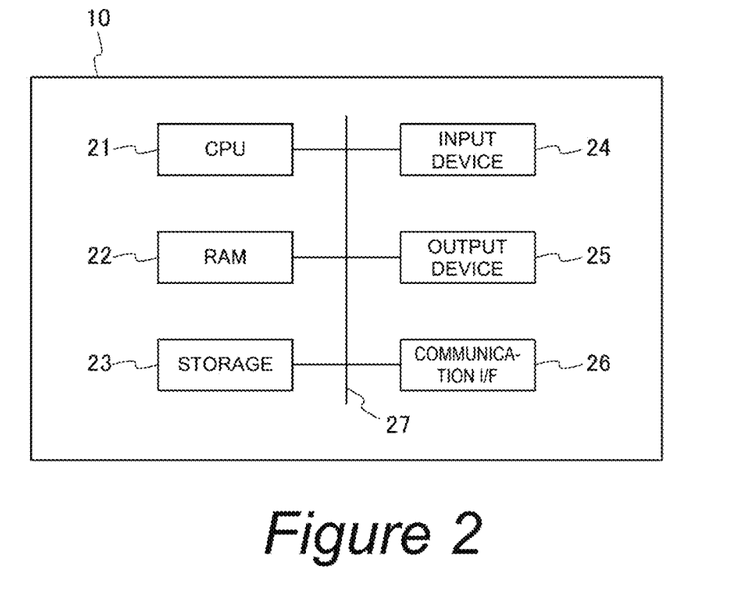
FIG. 2 is a block diagram showing the hardware configuration of the musical analysis device according to the embodiment of the present disclosure.

FIG. 2 is a block diagram showing a hardware configuration of the musical analysis device 10 according to the embodiment of the present disclosure. The musical analysis device 10 is, for example, a smartphone that has an information processing function and a wireless communication function. As shown in FIG. 2, the musical analysis device 10 comprises a CPU (Central Processing Unit) 21, a RAM (Random Access Memory) 22, a storage 23, an input device 24, an output device 25, a communication interface (I/F) 26, and a bus 27.

The CPU 21 is a processing circuit that executes various computations in the musical analysis device 10. The RAM 22 is a volatile storage medium that functions as a working memory in which values (parameters) used by the CPU 21 are stored, and from which various programs are deployed. The storage 23 is a non-volatile storage medium that stores the above-mentioned detection model 18 and various programs executed by the CPU 21.

The RAM 22 and the storage 23 constitute the storage device 17 shown in FIG. 1. The CPU 21 reads the detection model 18 and the programs stored in the storage 23 into the RAM 22 and executes them, thereby realizing the functional blocks (the acquisition module 12 to the output module 16) related to the control device 11, and realizing various processes related to the present embodiment. Thus, in the illustrated embodiment, the control device 11 is an electronic controller including one or more processors, such as the CPU 21. However, the control device 11 can be configured to comprise, instead of the CPU 21 or in addition to the CPU 21, programmable logic devices such as a DSP (Digital Signal Processing or Processor), an FPGA (Field Programmable Gate Array), and the like. In addition, the control device 11 can include a plurality of CPUs (or a plurality of programmable logic devices). Also, in the illustrated embodiment, the programs are stored in a non-transitory computer-readable medium, such as the storage device 17, and causes the control device 11 to execute a musical analysis method or function as the acquisition module 12, the extraction module 13, the detection module 14, the correction module 15, and the output module 16.

The input device 24 is an element on the musical analysis device 10 that receives user operations, and is composed of a button, for example. The output device 25 is a device for displaying various information to the user, and is composed of a liquid-crystal display, for example. A touch screen that functions as the input device 24 and the output device 25 can also be used.

The communication interface (I/F) 26 is an element that connects the musical analysis device 10 and an external device, and is, for example, a communication module that realizes a cellular communication function, a wireless LAN communication function, etc. The bus 27 is a signal transmission line (system bus) that connects the hardware elements of the above-described musical analysis device 10 to each other.

The musical analysis device 10 can be realized by an arbitrary information processing device other than a smartphone, such as a personal computer or a server. In addition, the musical analysis device 10 can be realized by an electronic instrument that has an information processing function, such as an electronic piano.

Figure 3:
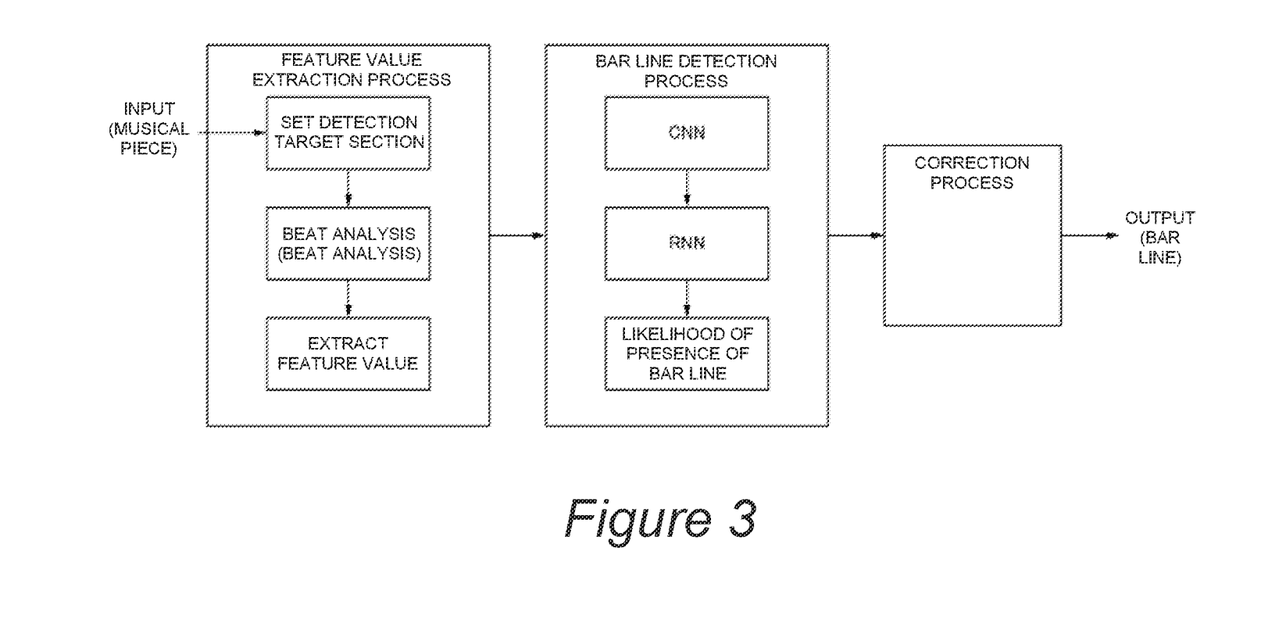
FIG. 3 is an explanatory diagram showing the overall image of a measure identification process according to the embodiment of the present disclosure.

FIG. 3 is an explanatory diagram showing the measure identification process according to the embodiment of the present disclosure. The measure identification process of the present embodiment includes a feature value extraction process, a bar line detection process, and a correction process.

In the feature value extraction process, the extraction module 13 sets a detection target section in the musical piece acquired by the acquisition module 12. Music data can include a non-chord section (atonal section) that does not show tonality. A non-chord section is, for example, a silent section before the start of the musical piece, or a section at the beginning of the musical piece in which a drum solo is played. The extraction module 13 preferably sets the section after the non-chord section ends as the bar line detection target section, based on chord analysis information, which indicates chord transitions of the musical piece in a time-sequential manner. The chord analysis information can be appended to the music data in advance, or be acquired by the control device 11 based on various known methods.

If the beginning of the detection target section is set incorrectly before the bar lines and the beats are detected, described further below, there is the problem of the misalignment at the beginning having a continuing impact on the musical piece, so that the beats and the bar lines cannot be accurately detected. The above-described problem is particularly noticeable in configurations which use deep learning for the analysis of audio information, as in the present embodiment. However, by means of the configuration of the extraction module 13 described above, a non-chord section is identified using the chord analysis information, and the section that follows the end of the non-chord section ends is set as the detection target section, so that it is possible to appropriately solve the problem described above. The setting (selection) of the detection target section as described above is not essential, and a configuration in which the entire acquired musical piece is set as the detection target section can also be employed.

The extraction module 13 then subjects the audio information included in the input musical piece to beat analysis (beat analysis), in order to detect beats, extracts a feature value (for example, a high-dimensional feature vector) for each of the detected beats, and outputs the feature value to the detection module 14. One beat corresponds to the time interval between two consecutive beat points. An example of a feature value of the present embodiment is a mel-scale logarithmic spectrum (MSLS) calculated for each beat.

In the bar line detection process, the detection module 14 detects bar lines based on audio information indicating a musical piece and outputs the bar lines to the correction module 15. More specifically, the detection module 14 uses the detection model 18 through a model training process with machine learning in order to estimate the likelihood of the presence of a bar line for each beat of the musical piece, based on the feature vector for each beat extracted from the audio information by the extraction module 13, and outputs the bar line presence likelihood to the correction module 15. The presence likelihood described above is, preferably, a two-class value (1: bar line present, 0: not present) which indicates whether there is a bar line at the beginning of the beat. A section from a bar line detected in this way to the next bar line (section that includes a beat with a likelihood of 1 to the beat before the next beat with a likelihood of 1) corresponds to one measure. The bar line presence likelihood can be expressed as a continuous value from 0 to 1 instead of as a discrete value as described above.

The detection model 18 of the present embodiment includes a convolutional neural network (CNN) and a recurrent neural network (RNN), learned by means of deep learning through supervised learning using the feature value for each beat extracted from the audio information of the musical piece, and a bar line label which indicates the presence of a bar line for each beat as training data. The musical piece input during the learning phase is preferably a musical piece in which the meter of the musical piece changes in a time-sequential manner in accordance with the progression of the musical piece. Music data can be, for example, sound source data generated by a synthesizer based on MIDI data. The structure of the recurrent neural network can be, for example, a gated recurrent unit (GRU) or a long short-term memory (LSTM). The recurrent neural network can be configured bidirectionally.

In the correction process, the correction module 15 corrects the positions of the bar lines, detected by means of the bar line detection process described above, based on the reference meter B. More specifically, the correction module 15 corrects the positions of the bar lines such that the number of measures consisting of a reference number of beats b, which is the number of beats included in one measure of the reference meter B (for example, four beats of quarter notes in the case of 4/4 time, and six beats of eighth notes in the case of 6/8 time), increases. "Correcting the position of the bar line" corresponds to "changing a value indicating the likelihood of presence of a bar line." Details of the correction process will be described further below with reference to FIGS. 4 to 7.

As described above, the musical analysis device 10 according to the present embodiment corrects the positions of the bar lines detected by the bar line detection process so as to increase the number of measures consisting of the reference number of beats b included in the reference meter B, which forms the basis for the musical piece. It is therefore possible to correct the positions of the bar lines to better suit the musical piece.

Note that the measure identification process can include only the bar line detection process and the correction process, without including the feature value extraction process. For example, the detection module 14 can detect bar lines with respect to the feature value of a musical piece acquired by means of an arbitrary method, and the correction module 15 can correct the positions of the detected bar lines.

Figure 4:
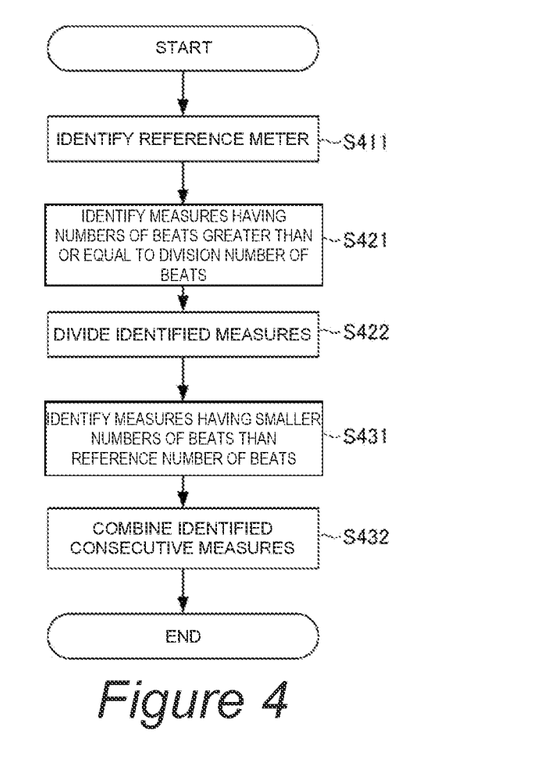
FIG. 4 is a flowchart showing the correction process included in the measure identification process according to the embodiment of the present disclosure.
Figure 5:
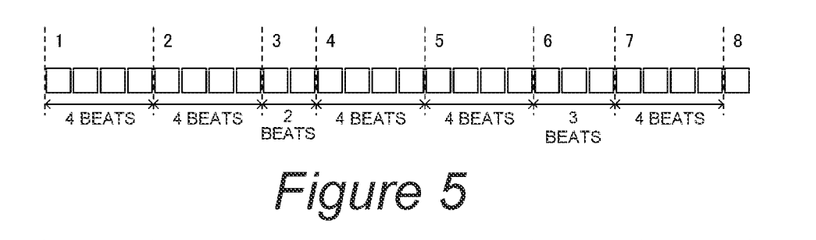
FIG. 5 is a diagram explaining the identification of a reference meter according to the embodiment of the present disclosure.
Figure 6:
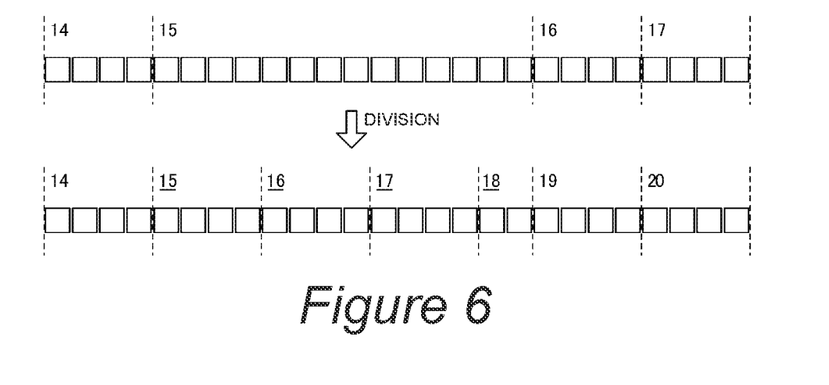
FIG. 6 is an explanatory diagram showing an example (division of measures) of the correction process according to the embodiment of the present disclosure.
Figure 7:
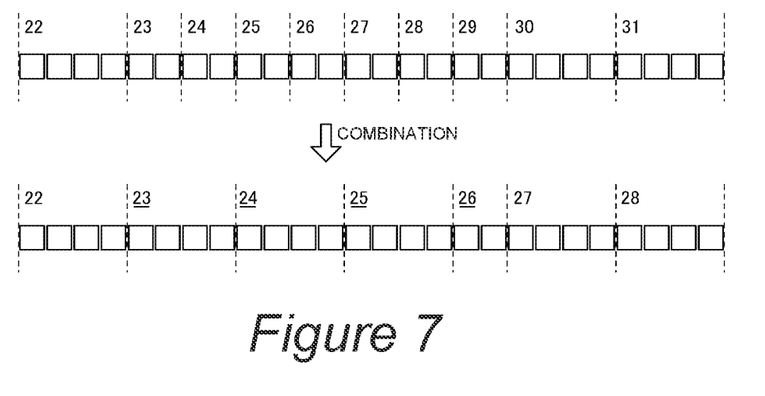
FIG. 7 is an explanatory diagram showing an example (combination of measures) of the correction process according to the embodiment of the present disclosure.

FIG. 4 is a flowchart showing the correction process included in the measure identification process according to the embodiment of the present disclosure. FIG. 5 is a diagram for explaining the identification of the reference meter according to the embodiment of the present disclosure. FIGS. 6 and 7 are explanatory diagrams showing examples (division and combination of measures) of the correction process according to the embodiment of the present disclosure. In FIGS. 5 to 7, the squares indicate one beat of the musical piece, and the numbers above the squares indicate measure numbers.

In Step S411, the correction module 15 identifies the reference meter B that is referred to in the subsequent division process and combination process. More specifically, as shown in FIG. 5, the correction module 15 identifies the meter that occurs most frequently in the plurality of measures detected by the detection module 14 as the reference meter B of the musical piece. The number of beats included in the reference meter B is hereinafter referred to as the reference number of beats b. The reference meter B can be identified through a series of measure identification processes that include the present correction process, or be identified in advance by another means besides the measure identification process and supplied to the correction module 15.

In Steps S421 and S422, the correction module 15 corrects the position of the bar lines detected by the detection module 14 such that measures longer than the reference meter B are divided. The details thereof will be described with reference to FIG. 6.

In Step S421, the correction module 15 identifies measures having numbers of beats greater than or equal to a division number of beats dv (for example, six), obtained by adding a prescribed value n (for example, two) to the reference number of beats b (for example, four). In FIG. 6, the 15th measure has 14 beats, which is a number of beats greater than or equal to the division number of beats dv (=6).

In Step S422, the correction module 15 divides the measures identified in Step S421 into one or more measures, each consisting of the reference number of beats b. In the present example, the correction module 15 divides the 15th measure having 14 beats (≥dv) every reference number of beats b (=4) from the beginning, thereby correcting the positions of the bar lines such that the new 15th to 17th measures, each consisting of the reference number of beats b, are provided.

In Steps S431 and S432, the correction module 15 corrects the positions of the bar lines detected by the detection module 14 such that measures shorter than the reference meter B are combined. The details thereof will be described with reference to FIG. 7.

In Step S431, the correction module 15 identifies measures having fewer numbers of beats than the reference number of beats b. In FIG. 7, each of the 23rd to the 29th measures has two beats, which is a smaller number of beats than the reference number of beats b (=4).

In Step S432, the correction module 15 combines two or more consecutive measures identified in Step S431 into a measure consisting of the reference number of beats b. In the present example, the correction module 15 respectively combines the 23rd and 24th measures, the 25th and 26th measures, and the 27th and 28th measures, thereby correcting the positions of the bar lines such that new 23rd to the 25th measures, each consisting of the reference number of beats b, are provided.

As described above, the musical analysis device 10 according to the present embodiment corrects the positions of the bar lines so as to divide measures having numbers of beats greater than or equal to the division number of beats dv, obtained by adding the prescribed value n to the reference number of beats b. By means of the configuration described above, measures detected to be incorrectly long are divided such that the positions of bar lines are corrected so as to be better suit the musical piece.

If all the measures that are longer than the reference meter B are divided, a large number of relatively short leftover measures can be generated. By means of the configuration described above, because the target of division is limited to measures having numbers of beats greater than or equal to the division number of beats dv, the occurrence of the problem described above is suppressed.

In addition, the musical analysis device 10 according to the present embodiment combines two or more consecutive measures, each having a smaller number of beats than the reference number of beats b, thereby correcting the positions of the bar lines such that the measures consist of the reference number of beats b. By means of the configuration described above, measures that are detected to be incorrectly short are combined such that the positions of bar lines are corrected so as to better suit the musical piece.

In the present embodiment described above, the correction module 15 executes both the division process (S421, S422) and the combination process (S431, S432). However, a configuration in which the correction module 15 executes only either the division process or the combination process can be employed. In addition, the algorithm of the division process and the algorithm of the combination process are not limited to the algorithms of the above-described steps.

Figure 8:
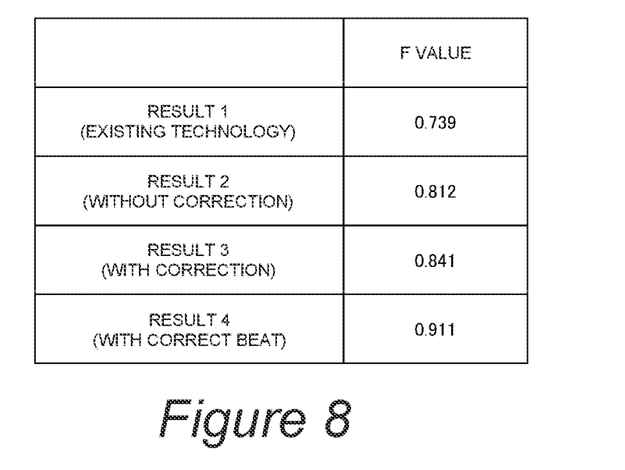
FIG. 8 is a table showing experimental results relating to the accuracy of measure identification by means of the configuration of the embodiment of the present disclosure.

FIG. 8 is a table showing experimental result relating to the accuracy of measure identification by means of the configuration of the present embodiment. In this table the accuracy of the measure identification is represented using an F value (value indicating the harmonic mean of the recurrence rate and conformance rate). In the present experiment, a total of 410 musical pieces, 299 of which have an unchanging meter and 111 of which have a changing meter, were used as input musical pieces.

Result 1 is the result of measure identification by means of the prior art using a hidden semi-Markov model. Result 2 is the result of measure identification for a case in which the correction process is not executed in the configuration of the present embodiment. Result 3 is the result of measure identification for a case in which the configuration of the present embodiment (feature value extraction process, bar line detection process, and correction process) is executed. Result 4 is the result of measure identification for a case in which correct beat information, indicating the correct beat, is provided, instead of detecting beats by means of beat analysis in the configuration of the present embodiment.

As can be understood from the comparison between Result 1 and Results 2-4, the accuracy of the measure identification process according to the present embodiment was higher than the accuracy of the measure identification process according to the prior art. Even if the correct beat information is not particularly provided as in the case of Result 4, the accuracy achieved by means of the present embodiment (Results 2 and 3) was higher than the accuracy according to the prior art (Result 1).

In addition, as can be understood from the comparison between Result 2 and Result 3, in the case in which the comparison process of the present embodiment was executed (Result 2), the accuracy of measure identification improved as compared with the case in which only the feature value extraction process and the bar line detection process were executed (Result 3).

Modified Examples

The embodiment described above can be variously modified. Specific modified embodiments are illustrated below. Two or more embodiments arbitrarily selected from the above-described embodiment and the following examples can be appropriately combined as long as they are not mutually contradictory.

In the embodiment described above, the section following the end of the non-chord section is set as the bar line detection target section. That is, bar lines are not identified in non-chord sections. However, bar lines can be identified in non-chord sections. For example, the detection module 14 or the correction module 15 can, after bar lines are detected in the detection target section, go back to the non-chord section before the detection target section and add bar lines. Preferably, bar lines are added such that measures consisting of the reference number of beats b are provided.

In the division process (Steps S421, S422), the correction module 15 preferably suppresses the generation of leftover measures that are shorter than the reference number of beats b. For example, a case is assumed in which a leftover measure is about to be generated by the correction module 15 as a result of division (for example, the 18th measure having two beats in FIG. 6 (after division)), and the sum of the number of beats of the leftover measure and the immediately preceding measure located immediately before the leftover measure (for example, the 17th measure with four beats in FIG. 6 (after division)) (4+2=6) is less than the division number of beats dv (for example, dv=7 in the present modified example). In the above-described case, the correction module 15 preferably does not divide the leftover measure and the immediately preceding measure, that is, the correction module does not execute the division process at locations where leftover measures that are shorter than the reference number of beats b are generated. In the example of FIG. 6, following division, it is preferable for the position of the bar line to be corrected such that a measure with 6 beats, obtained by combining the 17th and 18th measures, is generated.

In the combination process (Steps S431, S432), the correction module 15 preferably excludes from the target of combination measures having a number of beats that exceeds ½ of the reference number of beats b. For example, in a case in which the reference meter B is 4/4 time and the reference number of beats b is four beats, there is a relatively high probability that in the 4/4 time section it is further divided than the actual measure structure, and a measure with 2/4 time (a measure having a number of beats smaller than or equal to ½ of the reference number of beats b) is incorrectly detected. On the other hand, there is a relatively low probability that in a 4/4 time section a measure with 3/4 time, which is different from 4/4 time in terms of musical composition, will be incorrectly detected. That is, a measure with 3/4 time that is detected in a musical piece whose reference meter B is 4/4 time is relatively likely to have been correctly detected. Therefore, the correction module 15 preferably excludes from the target of combination measures having numbers of beats exceeding ½ of the reference number of beats b, while two or more consecutive measures, each having a number of beats smaller than or equal to ½ of the reference number of beats b are combined in order to correct the positions of the bar lines such that the measures consist of the reference number of beats b.

Preferred embodiments of the present invention have been described above, but the above-described embodiments are merely examples of configurations that can realize the present invention. The present invention is not limited to the configurations described in the embodiments described above, and various modifications and changes can be made within its scope. For example, the present invention can be realized by supplying programs that implement one or more functions of the above-described embodiments to systems and devices via a network or a non-transitory storage medium, and to one or more processors of a computer of the system or device reading the programs and executing the processes. In addition, the present invention can be achieved by means of a circuit (for example, an ASIC) that realizes one or more functions.

What is claimed is:

1. A musical analysis device comprising:
    an electronic controller including at least one processor, the electronic controller being configured to execute a plurality of modules including
        a detection module configured to detect, using a detection model through a model training process with machine learning, bar lines based on audio information indicating a musical piece, and
        a correction module configured to correct positions of the bar lines detected by the detection module based on a reference meter identified from the musical piece, such that a number of measures having a reference number of beats included in the reference meter increases, and
    the correction module being configured to correct the positions of the bar lines to obtain one or more measures having the reference number of beats by dividing a measure having a number of beats greater than or equal to a division number of beats, obtained by adding a prescribed value to the reference number of beats.

2. The musical analysis device according to claim 1, wherein,
    in a case in which a leftover measure having a number of beats less than the reference number of beats is to be generated as a result of the division, and a sum of the number of beats of the leftover measure and a number of beats of an immediately preceding measure located immediately before the leftover measure is less than the division number of beats, the correction module is configured to correct the positions of the bar lines so as not to divide the leftover measure and the immediately preceding measure.

3. The musical analysis device according to claim 1, wherein
    the correction module is configured to correct the positions of the bar lines to obtain a measure having the reference number of beats by combining two or more consecutive measures, each having a number of beats less than the reference number of beats.

4. The musical analysis device according to claim 3, wherein
    the correction module is configured to correct the positions of the bar lines to obtain the measure having the reference number of beats by excluding, from a target of the combining, a measure having a number of beats exceeding ½ of the reference number of beats, and by combining two or more consecutive measures, each having a number of beats less than or equal to ½ of the reference number of beats.

5. The musical analysis device according to claim 1, wherein
    the musical piece includes a plurality of measures having different meters, and
    the reference meter is a meter that occurs most frequently in the musical piece.

6. The musical analysis device according to claim 1, wherein
    the electronic controller is configured to further execute an extraction module configured to set a section after a non-chord section, which does not show tonality, ends in the musical piece as a bar line detection target section.

7. The musical analysis device according to claim 1, wherein
    the detection model includes a convolutional neural network and a recurrent neural network learned using the audio information and bar line information, which is training data,
    an input of the detection model is a feature vector extracted for each beat from the musical piece, and
    an output of the detection model is a bar line presence likelihood estimated for each beat of the musical piece.

8. A musical analysis method realized by a computer, the music analysis method comprising:
    detecting, using a detection model through a model training process with machine learning, bar lines based on audio information indicating a musical piece; and
    correcting positions of the detected bar lines based on a reference meter identified from the musical piece, such that a number of measures having a reference number of beats included in the reference meter increases,
    the positions of the bar lines being corrected to obtain one or more measures having the reference number of beats by dividing a measure having a number of beats greater than or equal to a division number of beats, obtained by adding a prescribed value to the reference number of beats.

9. The musical analysis method according to claim 8, wherein,
in a case in which a leftover measure having a number of beats less than the reference number of beats is to be generated as a result of the division, and a sum of the number of beats of the leftover measure and a number of beats of an immediately preceding measure located immediately before the leftover measure is less than the division number of beats, the positions of the bar lines are corrected so as not to divide the leftover measure and the immediately preceding measure.

10. The musical analysis method according to claim 8, wherein
the positions of the bar lines are corrected to obtain a measure having the reference number of beats by combining two or more consecutive measures, each having a number of beats less than the reference number of beats.

11. The musical analysis method according to claim 10, wherein
the positions of the bar lines are corrected to obtain the measure having the reference number of beats by excluding, from a target of the combining, a measure having a number of beats exceeding ½ of the reference number of beats, and by combining two or more consecutive measures, each having a number of beats less than or equal to ½ of the reference number of beats.

12. The musical analysis method according to claim 8, wherein
the musical piece includes a plurality of measures having different meters, and
the reference meter is a meter that occurs most frequently in the musical piece.

13. The musical analysis method according to claim 8, further comprising
setting a section after a non-chord section, which does not show tonality, ends in the musical piece as a bar line detection target section.

14. The musical analysis method according to claim 8, wherein
the detection model includes a convolutional neural network and a recurrent neural network learned using the audio information and bar line information, which is training data,
an input of the detection model is a feature vector extracted for each beat from the musical piece, and
an output of the detection model is a bar line presence likelihood estimated for each beat of the musical piece.

15. A musical analysis device comprising:
an electronic controller including at least one processor, the electronic controller being configured to execute a plurality of modules including
a detection module configured to detect, using a detection model through a model training process with machine learning, bar lines based on audio information indicating a musical piece,
a correction module configured to correct positions of the bar lines detected by the detection module based on a reference meter identified from the musical piece, and
an extraction module configured to set a section after a non-chord section, which does not show tonality, ends in the musical piece as a bar line detection target section.

16. A music analysis method realized by a computer, the music analysis method comprising:
detecting, using a detection model through a model training process with machine learning, bar lines based on audio information indicating a musical piece;
correcting positions of the detected bar lines based on a reference meter identified from the musical piece; and
setting a section after a non-chord section, which does not show tonality, ends in the musical piece as a bar line detection target section.

* * * * *